US010606496B1

(12) United States Patent
Mallick et al.

(10) Patent No.: US 10,606,496 B1
(45) Date of Patent: Mar. 31, 2020

(54) HOST DEVICE WITH MULTI-PATH LAYER IMPLEMENTING AUTOMATIC STANDBY SETTING FOR ACTIVE-ACTIVE CONFIGURATION

(71) Applicant: EMC IP Holding Company LLC, Hopkinton, MA (US)

(72) Inventors: Sanjib Mallick, Bangalore (IN); Vinay G. Rao, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/142,274

(22) Filed: Sep. 26, 2018

(51) Int. Cl.
| | |
|---|---|
| *G06F 13/10* | (2006.01) |
| *G06F 3/06* | (2006.01) |
| *H04L 12/26* | (2006.01) |
| *H04L 12/947* | (2013.01) |
| *H04L 12/707* | (2013.01) |

(52) U.S. Cl.
CPC ............ *G06F 3/0635* (2013.01); *G06F 3/061* (2013.01); *G06F 3/067* (2013.01); *G06F 3/0607* (2013.01); *G06F 3/0634* (2013.01); *G06F 3/0653* (2013.01); *G06F 13/102* (2013.01); *H04L 43/0852* (2013.01); *H04L 43/16* (2013.01); *H04L 45/24* (2013.01); *H04L 49/25* (2013.01)

(58) Field of Classification Search
None
See application file for complete search history.

(56) References Cited

U.S. PATENT DOCUMENTS

| | | |
|---|---|---|
| 6,687,746 B1 | 2/2004 | Shuster et al. |
| 6,697,875 B1 | 2/2004 | Wilson |
| 7,275,103 B1* | 9/2007 | Thrasher ................. H04L 45/22 709/223 |
| 7,454,437 B1 | 11/2008 | Lavallee et al. |
| 7,668,981 B1* | 2/2010 | Nagineni ............ H04L 41/0896 710/15 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Elias Mamo
(74) *Attorney, Agent, or Firm* — Ryan, Mason & Lewis, LLP (57) ABSTRACT

A first host device in an illustrative embodiment comprises a multi-path input-output (MPIO) driver configured to separate paths from the first host device to first and second storage systems into a first set of paths to the first storage system and a second set of paths to the second storage system, and to monitor performance of at least subsets of the first and second sets of paths. Responsive to detection of a performance deviation between the first and second sets of paths that exceeds a specified threshold, the MPIO driver automatically places the paths of the set exhibiting lower performance in a standby mode of operation and the paths of the other set in an active mode of operation. Absent any such performance deviation, the MPIO driver automatically places the paths of one of the sets in the standby mode of operation and the paths of the other one of the sets in the active mode of operation.

20 Claims, 3 Drawing Sheets

(56) References Cited

U.S. PATENT DOCUMENTS

| | | | |
|---|---|---|---|
| 7,818,428 B1 | 10/2010 | Lavallee et al. | |
| 7,925,872 B2 | 4/2011 | Lai et al. | |
| 8,250,256 B2* | 8/2012 | Ghosalkar | G06F 3/0613 710/18 |
| 8,832,334 B2* | 9/2014 | Okita | G06F 3/00 710/36 |
| 9,594,780 B1 | 3/2017 | Esposito et al. | |
| 9,778,852 B1 | 10/2017 | Marshak et al. | |
| 2004/0010563 A1 | 1/2004 | Forte et al. | |
| 2006/0026346 A1* | 2/2006 | Kadoiri | G06F 3/061 711/114 |
| 2008/0043973 A1 | 2/2008 | Lai et al. | |
| 2011/0197027 A1 | 8/2011 | Balasubramanian et al. | |
| 2012/0102369 A1* | 4/2012 | Hiltunen | G06F 11/008 714/48 |
| 2015/0242134 A1* | 8/2015 | Takada | G06F 3/061 711/114 |
| 2016/0117113 A1 | 4/2016 | Li et al. | |
| 2018/0317101 A1* | 11/2018 | Koue | H04W 24/02 |

OTHER PUBLICATIONS

NVM Express, "NVM Express, Revision 1.3," NVM Express, May 1, 2017, 282 pages.

U.S. Appl. No. 15/849,828 filed in the name of Sanjib Mallick et al. on Dec. 21, 2017 and entitled "Storage System with Input-Output Performance Control Utilizing Application Process Detection."

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

U.S. Appl. No. 15/795,653 filed in the name of Maneesh Pusalkar et al. on Oct. 27, 2017 and entitled "Storage System with Network-Wide Configurable Device Names."

* cited by examiner

HOST DEVICE WITH MULTI-PATH LAYER IMPLEMENTING AUTOMATIC STANDBY SETTING FOR ACTIVE-ACTIVE CONFIGURATION

FIELD

The field relates generally to information processing systems, and more particularly to storage in information processing systems.

BACKGROUND

Storage arrays and other types of storage systems are often shared by multiple host devices over a network. However, problems can arise in such arrangements when paths from one or more of the host devices to the storage system experience performance degradations. In some cases, the performance degradations may be related to network switch fabric reconfigurations. For example, fabric reconfigurations can necessitate a fabric rediscovery process in which potentially large numbers of required state change notification (RSCN) messages are generated and transmitted over a given fabric. These and other fabric-related performance degradations can be particularly problematic when a given host device interacts with multiple storage arrays arranged in an active-active configuration to support data replication across the multiple storage arrays for failure recovery purposes.

SUMMARY

Illustrative embodiments configure a multi-path layer of one or more host devices to include automatic standby setting functionality for sets of paths utilized to communicate with multiple storage systems arranged in an active-active configuration. The sets of paths illustratively comprise paths through a storage area network (SAN) or other type of network over which one or more host devices communicate with a storage array or other type of storage system. The multi-path layer illustratively comprises at least one multi-path input-output (MPIO) driver configured to process input-output (IO) operations of at least one host device that communicates with multiple distinct storage arrays or other types of storage systems. The multi-path layer in such arrangements can be configured, for example, to separate a plurality of paths into sets of paths associated with respective storage arrays, and to automatically designate one set of paths as standby paths and the other set of paths as active paths, even in the absence of any substantial performance deviation between the sets of paths.

Such embodiments advantageously allow the MPIO driver to limit the exposure of the host device to current or future issues associated with a particular fabric, such as a current or future performance degradation due to an ongoing fabric rediscovery process or other fabric-related issue of the particular fabric. As a result, improved performance in processing of IO operations is achieved in illustrative embodiments. Moreover, data replication across multiple storage arrays arranged in an active-active configuration is facilitated, thereby providing more efficient protection against failures.

In one embodiment, an apparatus comprises a first host device configured to communicate with first and second storage systems over at least one network. The first host device comprises a MPIO driver configured to control delivery of IO operations from the first host device to the first and second storage systems. The MPIO driver is further configured to separate paths from the first host device to the first and second storage systems into a first set of paths from the first host device to the first storage system and a second set of paths from the first host device to the second storage system, and to monitor performance of at least subsets of the first and second sets of paths. Responsive to detection of a performance deviation between the first and second sets of paths that exceeds a specified threshold, the MPIO driver automatically places the paths of the set exhibiting lower performance in a standby mode of operation and the paths of the other set in an active mode of operation. Absent any such performance deviation, the MPIO driver automatically places the paths of one of the sets in the standby mode of operation and the paths of the other one of the sets in the active mode of operation.

The first and second storage systems are illustratively arranged in an active-active configuration relative to one another, although other arrangements are possible in other embodiments.

The MPIO driver is illustratively configured to avoid sending IO operations over the set of paths that is in the standby mode of operation. For example, the MPIO driver can be configured to send no IO operations over the set of paths that is in the standby mode of operation. The MPIO driver in some embodiments is further configured to interchange the standby and active modes of operation of the respective sets of paths responsive to detection of a performance degradation for the set of paths that is in the active mode of operation.

The MPIO driver in separating the paths into the first and second sets of paths in some embodiments is further configured to send a predetermined command over each of the paths, to determine storage system identifiers for the respective paths based at least in part on responses to the predetermined command, and to assign each of the paths to one of the first and second sets of paths based at least in part on its corresponding storage system identifier.

The predetermined command illustratively comprises a Small Computer System Interface (SCSI) command of a particular type, such as an SCSI inquiry command that when sent to one of the first and second storage systems returns a storage system identifier comprising at least one of a serial number and a device number of a storage array of that storage system. Alternatively, the predetermined command can comprise a vendor unique (VU) command of the first and second storage systems.

In some embodiments, the one or more networks over which the first host device is configured to communicate with the first and second storage systems comprise multiple distinct switch fabrics including at least a first switch fabric over which the first host device is configured to communicate with the first storage system, and a second switch fabric over which the first host device is configured to communicate with the second storage system.

The paths in some embodiments are associated with respective initiator-target pairs, with the initiators being implemented on the first host device and the targets being implemented on the first and second storage systems. For example, the initiators of the initiator-target pairs illustratively comprise respective host bus adaptors (HBAs) of the first host device and the targets of the initiator-target pairs illustratively comprise respective storage array ports of the first and second storage systems.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
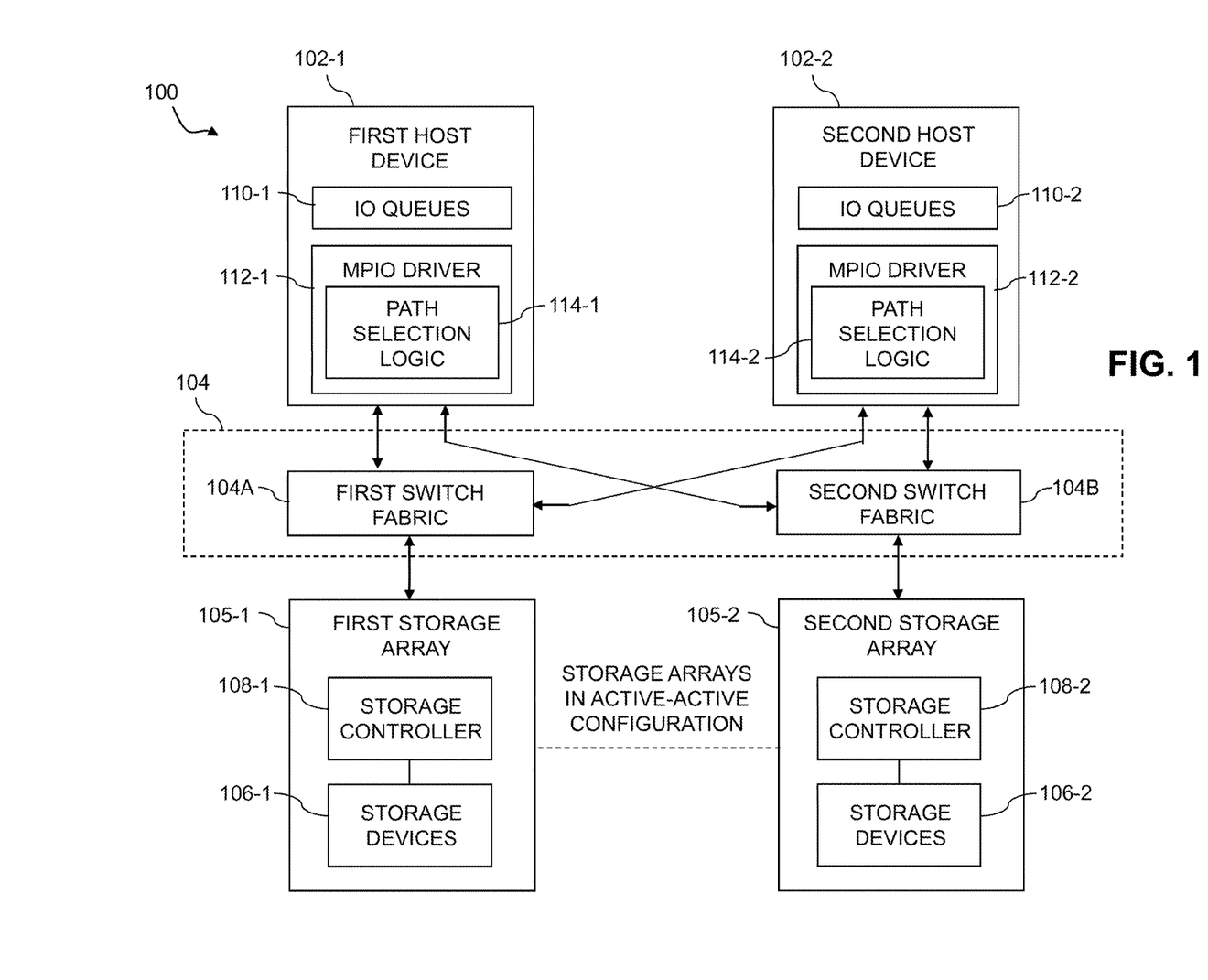
FIG. 1 is a block diagram of an information processing system configured with functionality for automatic standby setting utilizing a multi-path layer of a host device in an illustrative embodiment.

FIG. 1 shows an information processing system 100 configured in accordance with an illustrative embodiment. The information processing system 100 comprises at least first and second host devices 102-1 and 102-2. The host devices 102 are coupled to a network 104 that comprises at least first and second switch fabrics 104A and 104B. The host devices communicate over the network 104 via switch fabrics 104A and 104B with at least first and second storage arrays 105-1 and 105-2. For example, the network 104 illustratively comprises at least one storage area network (SAN) and the fabrics 104A and 104B illustratively comprise respective distinct switch fabrics of a set of multiple switch fabrics interconnecting the host devices 102 with the storage arrays 105 over the one or more SANs. Each of the fabrics 104A and 104B in some embodiments is associated with a different SAN.

The system 100 is configured such that the first host device 102-1 communicates with the first storage array 105-1 over the first switch fabric 104A and communicates with the second storage array 105-2 over the second switch fabric 104B. Similarly, the second host device 102-2 communicates with the first storage array 105-1 over the first switch fabric 104A and communicates with the second switch fabric 104B. Numerous other interconnection arrangements are possible.

Although only two host devices 102, two switch fabrics 104A and 104B and two storage arrays 105 are shown in the figure, this is by way of illustrative example only, and other embodiments can include additional instances of such elements.

The storage arrays 105-1 and 105-2 comprise respective sets of storage devices 106-1 and 106-2 coupled to respective storage controllers 108-1 and 108-2. The storage arrays 105-1 and 105-2 are assumed to be arranged in an active-active configuration. In such an arrangement, data stored in one of the storage arrays is replicated to the other one of the storage arrays. For example, synchronous or asynchronous data replication techniques that are well-known to those skilled in the art can be used. Such data replication across the multiple storage arrays 105 can be used to facilitate failure recovery in the system 100. One of the storage arrays may therefore operate as a production storage array relative to the other storage array which operates as a backup or recovery storage array.

The sets of storage devices 106 store data utilized by one or more applications running on one or more of the host devices 102. The sets of storage devices 106 are illustratively arranged in one or more storage pools. The storage arrays 105 and their respective sets of storage devices 106 are examples of what are more generally referred to herein as "storage systems." A given such storage system in the present embodiment is shared by the host devices 102, and is therefore also referred to herein as a "shared storage system."

The host devices 102 illustratively comprise respective computers, servers or other types of processing devices capable of communicating with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The sets of storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage arrays 105 to include different portions of one or more physical storage devices. The sets of storage devices 106 may therefore be viewed as comprising respective LUNs or other logical storage volumes.

Each of the host devices 102 illustratively has multiple paths to each of the storage arrays 105, with at least one of the storage devices 106 of one of the storage arrays 105 being visible to that host device on a given one of the paths. A given one of the storage devices 106 may be accessible to the given host device over multiple paths. Each of the host devices 102 illustratively has n paths to each of the storage arrays 105 via the network 104, although numerous other arrangements are possible. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The network 104 may be implemented using multiple networks of different types to interconnect storage system components. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated standby setting functionality using respective instances of path selection logic 114-1 and 114-2 implemented within the MPIO drivers 112.

The MPIO drivers 112 may comprise, for example, otherwise conventional MPIO drivers, such as PowerPath drivers from Dell EMC, suitably modified in the manner disclosed herein for automated standby setting. Other types of MPIO drivers from other driver vendors may be suitably modified to incorporate automated standby setting functionality as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The MPIO driver 112-1 is further configured to separate paths from the first host device 102-1 to the first and second storage arrays 105 into a first set of paths from the first host device 102-1 to the first storage array 105-1 and a second set of paths from the first host device 102-1 to the second storage array 105-2, and to monitor performance of at least subsets of the first and second sets of paths. Responsive to detection of a performance deviation between the first and second sets of paths that exceeds a specified threshold, the MPIO driver 112-1 automatically places the paths of the set exhibiting lower performance in a standby mode of operation and the paths of the other set in an active mode of operation. The MPIO driver 112-1 otherwise automatically places the paths of one of the sets in the standby mode of operation and the paths of the other one of the sets in the active mode of operation.

In some embodiments, the MPIO driver 112-1 avoids sending IO operations over the set of paths that is in the standby mode of operation. For example, the MPIO driver 112-1 may send no IO operations or only a minimal number of IO operations over the set of paths that is in the standby mode of operation.

The MPIO driver 112-1 can also interchange the standby and active modes of operation of the respective sets of paths responsive to detection of a performance degradation for the set of paths that is in the active mode of operation.

As mentioned previously, the network 104 in the present embodiment illustratively comprises at least one SAN and the switch fabrics 104A and 104B of the network 104 comprise respective distinct switch fabrics of a set of multiple switch fabrics interconnecting the host device 102-1 with the storage arrays 105 over the one or more SANs.

Each of the multiple switch fabrics illustratively has a distinct fabric identifier which is assumed to be globally unique within the information processing system 100. The term "fabric identifier" as used herein is intended to be broadly construed so as to encompass a fabric name or other type of information suitable for identifying a corresponding network switch fabric. Each of the paths between the host device 102-1 and the storage arrays 105 is assumed to be associated with only a single one of the multiple fabrics at a given point in time, although it is to be appreciated that the association of paths with respective fabrics can change over time, for example, as paths and/or fabrics are added to and/or removed from the system 100.

In separating the paths into the first and second sets of paths, the MPIO driver 112-1 illustratively sends a predetermined command over each of the paths, determines storage array identifiers for the respective paths based at least in part on responses to the predetermined command, and assigns each of the paths to one of the first and second sets of paths based at least in part on its corresponding storage array identifier.

The predetermined command utilized for determining storage array identifiers of respective paths illustratively comprises a SCSI command of a particular type, such as an inquiry command that when sent to one of the first and second storage arrays 105-1 and 105-2 returns a storage array identifier comprising at least one of a serial number and a device number of that storage array. Such a storage array identifier is an example of what is more generally referred to herein as a "storage system identifier." The term "storage system identifier" as used herein is intended to be broadly construed so as to encompass a serial number, device number or other type of information suitable for identifying a corresponding storage array or other type of storage system for purposes of fabric-based path selection.

Other types of SCSI or non-SCSI commands may be used in other embodiments, including commands that are part of a standard command set, or custom commands such as a "vendor unique command" or VU command that is not part of a standard command set. The term "predetermined command" as used herein is therefore intended to be broadly construed, so as to encompass, for example, a predetermined composite command that comprises a combination of multiple individual commands.

The paths over which the predetermined command is sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

In monitoring performance of at least subsets of the first and second sets of paths, the MPIO driver 112-1 illustratively measures response times of respective ones of the paths of the first and second sets of paths, and computes the performance deviation between the first and second sets of paths based at least in part on the measured response times. For example, the MPIO driver 112-1 can measure the response times utilizing a predetermined command sent over each of the paths. The predetermined command used by the MPIO driver 112-1 to measure response times may be a different predetermined command than that used by the MPIO driver to determine storage array identifiers for the respective paths.

For example, in determining if any paths are experiencing a response time degradation relative to other paths, the MPIO driver 112-1 illustratively sends another predetermined command to the storage arrays 105 over each of a plurality of paths from the host device 102-1 to the storage arrays 105, monitors a response time for the other predetermined command on each of the paths, and detects a performance issue with at least a given one of the paths based at least in part on the monitored response time.

The predetermined command for detection of response time degradation may be sent periodically over the paths, or under other specified conditions suitable for efficient monitoring of response times. In some embodiments, the predetermined command may be sent on each of the paths in each of a plurality of different periods of time. The different periods of time need not be of the same duration, and the particular set of paths over which the predetermined command is sent can vary from period to period.

The predetermined command for detection of response time degradation is illustratively different than the previously-described predetermined command used for determination of storage array identifiers. For example, the predetermined command for detection of response time degradation illustratively comprises a particular type of command selected to elicit a substantially immediate response from the storage arrays 105 such that the monitored response time is primarily comprised of path delay rather than storage array delay. Such a command is also referred to herein as an "immediate" command, as it elicits a substantially immediate response from the storage arrays 105, thereby allowing the MPIO driver 112-1 to utilize the monitored response time for a given one of the paths to characterize the delay of the given path.

In some embodiments, the predetermined command for detection of response time degradation also comprises a SCSI command of a particular type, such as at least one of a Test Unit Ready (TUR) command, an Inquiry command, and a Read Capacity command. These are all examples of SCSI "immediate" commands. Again, other types of SCSI or non-SCSI commands may be used in other embodiments, including commands that are part of a standard command set, or custom commands such as a "vendor unique command" or VU command that is not part of a standard command set.

Although different predetermined commands are used for determination of storage array identifiers and measurement of response times in the embodiments described above, it is possible that a single predetermined command, possibly in the form of a combination of multiple distinct sub-commands, can be used to perform both functions.

Additional or alternative predetermined commands can be used for other functions in other embodiments. For example, the MPIO driver 112-1 can determine the fabric identifiers for respective ones of a plurality of paths from the host device 102-1 to the storage arrays 105 by sending a predetermined command over each of the paths, and determining the fabric identifiers for the respective paths based at least in part on responses to the predetermined command. The predetermined command utilized for determining fabric identifiers of respective paths illustratively also comprises a SCSI command of a particular type, such as a log sense command or a mode sense command. Again, other types of SCSI or non-SCSI commands may be used for this function.

A path selection algorithm implemented by the path selection logic 114-1 of the MPIO driver 112-1 can be configured to incorporate such fabric identifiers in its path selection process. For example, in selecting particular ones of the paths for delivery of the IO operations to the storage arrays 105 based at least in part on the fabric identifiers, the path selection logic 114-1 of the MPIO driver 112-1 illustratively implements a path selection algorithm that selects particular ones of the paths at least in part as a function of their respective fabric identifiers, with the path selection algorithm being configured to balance the IO operations over the fabrics or to achieve other fabric-based selection goals.

In some embodiments, the path selection algorithm also takes into account additional path information other than the fabric, such as host device HBA and storage array port. For example, the path selection logic 114-1 can incorporate the use of fabric identifiers into a path selection algorithm that is based on host device HBA and storage array port. A given retry of a failed IO operation under such a path selection algorithm can select a path having a different fabric, host device HBA and storage array port for a given retry than that of the path selected for the original failed IO operation.

As noted above, the paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

In detecting a performance issue for a given one of the paths based at least in part on its monitored response time, the MPIO driver 112-1 is illustratively configured to determine a current response time for the given path from a response by the corresponding one of the storage arrays 105 to a current instance of the predetermined command for detection of response time degradation, to compare the current response time to a previous response time for the given path as determined from a response by the corresponding one of the storage arrays 105 to a previous instance of the predetermined command for detection of response time degradation, and responsive to the current response time being greater than the previous response time by more than a threshold amount, detecting the performance issue with the given path.

Alternative detection techniques based at least in part on monitored response time to one or more instances of the predetermined command for detection of response time degradation can be used. For example, a performance issue for a given path may be detected if its monitored response time in a current period exceeds a specified threshold, without reference to a response time differential relative to any previous period.

In some embodiments, the host device 102-1 is configured to generate a notification for delivery to a host administrator responsive to detection of the performance issue with the given path. Additionally or alternatively, the host device 102-1 may be configured to generate a notification for delivery to the corresponding one of the storage arrays 105 responsive to detection of the performance issue with the given path. Other types of reporting arrangements can be utilized in other embodiments, some of which involve mapping of storage devices to processes and mapping of processes to applications.

The above-described functions associated with automated standby setting functionality of the MPIO driver 112-1 are illustratively carried out at least in part under the control of its path selection logic 114-1. For example, the path selection logic 114-1 is illustratively configured to control performance of the steps of the flow diagram to be described below in conjunction with FIG. 2.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform the disclosed automated standby setting functionality. Accordingly, automated standby setting functionality described above in the context of the first MPIO driver 112-1 is assumed to be similarly performed by the other MPIO driver 112-2.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support automated standby setting.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of the automated standby setting techniques in a multi-path layer of a host device as disclosed herein, fabric-related performance degradations, such as those resulting from network switch fabric reconfigurations, can adversely impact system performance, particularly when the host device interacts with multiple storage arrays arranged in an active-active configuration. For example, fabric reconfigurations can necessitate a fabric rediscovery process in which potentially large numbers of RSCN messages are generated and transmitted over a given fabric, also referred to herein as an "RSCN storm." During such an RSCN storm, IO operations are not being serviced by the given fabric, potentially leading to a significant adverse performance impact within the system. If the fabric is sufficiently large, the RSCN storm can last tens of seconds and lead to numerous timeouts of IO operations. Under conventional practice, IO operations subject to timeout may be resent over the same fabric that is currently experiencing the RSCN storm. This can lead to failures of such retries, potentially causing an application failure and further exacerbating the problem. Similar problems can result from other types of fabric-related issues within the system.

Performance degradations associated with RSCN storms and other fabric-related issues are advantageously alleviated in illustrative embodiments herein by utilization of a multi-path layer comprising one or more of the MPIO drivers 112 to perform automated standby setting as described above.

Such functionality can be implemented with a wide variety of different storage arrays or other types of storage systems, potentially utilizing standardized or vendor unique commands such as SCSI commands.

As mentioned above, communications between the host devices 102 and the storage arrays 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

The storage arrays 105 may each additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage arrays 105 may each be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

For example, the storage arrays 105 may each comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105.

Numerous other distributed implementations of the host devices 102 and/or the storage arrays 105 are possible. Accordingly, the storage arrays 105 can each also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 210, and is suitable for use in the system 100 but is more generally applicable to other types of systems comprising multiple host devices and a shared storage system. The shared storage system in this embodiment is assumed to comprise at least first and second storage arrays arranged in an active-active configuration, with each storage array having a plurality of storage devices. The storage devices can include logical storage devices such as LUNs or other logical storage volumes.

Figure 2:
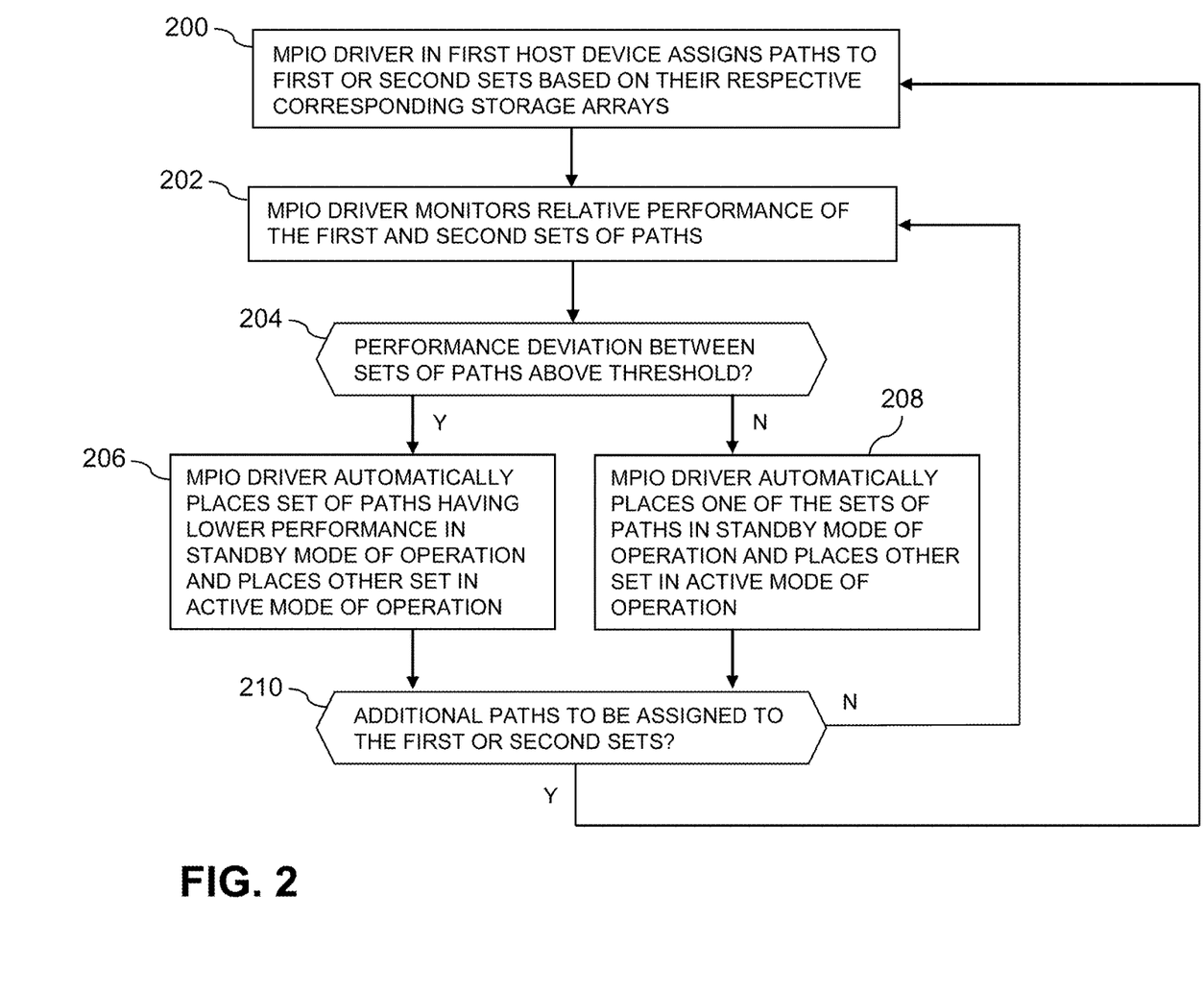
FIG. 2 is a flow diagram of a process for automatic standby setting utilizing a multi-path layer of a host device in an illustrative embodiment.

The steps of the FIG. 2 process are illustratively performed primarily by or under the control of an MPIO driver of a given host device, although other arrangements of system components can perform at least portions of one or more of the steps in other embodiments. This embodiment further assumes that the commands utilized by the host devices in generating IO operations such as read and write operations directed to the storage array comprise SCSI commands, although other types of commands can be used.

In step 200, the MPIO driver in the first host device assigns paths to first or second sets based on their respective corresponding storage arrays.

For example, the MPIO driver illustratively sends a predetermined command over each of the paths, determines storage array identifiers for the respective paths based at least in part on responses to the predetermined command, and assigns each of the paths to one of the first and second sets of paths based at least in part on its corresponding storage array identifier. As indicated previously, the predetermined command in such an embodiment illustratively comprises a SCSI command of a particular type, such as an inquiry command that when sent to one of the first and second storage arrays returns a storage array identifier comprising at least one of a serial number and a device number of the storage array, although other types of SCSI or non-SCSI commands could be used.

At least some of the paths from the first host device to the storage arrays may be determined using an initial path discovery scan performed in conjunction with booting of the host device. It is assumed for the description of this embodiment that the host device has discovered a plurality of paths to the storage arrays, and further that at least one storage device of at least one of the storage arrays is visible to the host device on each of the paths. Moreover, it is assumed that different ones of the paths are associated with respective different fabrics of a network that comprises multiple switch fabrics, such as network 104 of system 100.

The path discovery scan can be repeated responsive to one or more detected path changes or under other specified conditions. For example, a storage administrator or other user may perform zoning and/or masking changes to the storage array that result in at least one new path becoming available to the host device. Accordingly, the multiple paths over which the predetermined command is periodically sent by the host device to the storage arrays can change over time.

In step 202, the MPIO driver monitors relative performance of the first and second sets of paths.

For example, the MPIO driver in monitoring performance of at least subsets of the first and second sets of paths illustratively measures response times of respective ones of the paths of the first and second sets of paths, and computes the performance deviation between the first and second sets of paths based at least in part on the measured response times. The MPIO driver in measuring response times of respective ones of the paths of the first and second sets of paths is further configured to measure the response times utilizing a predetermined command sent over each of the paths. Such a predetermined command can be a different predetermined command than that used above to determine the storage array identifiers.

In step 204, a determination is made as to whether or not there is a performance deviation between the sets of paths that is above a specified threshold. If there is such a performance deviation, the process moves to step 206, and otherwise moves to step 208.

The determination in step 204 illustratively involves the MPIO driver monitoring response time for a predetermined command for detecting response time degradation on each of the paths. For example, the MPIO driver can determine a transmit timestamp associated with transmission of the predetermined command for detection of response time degradation over a given path, determine a receive timestamp associated with receipt of a response to the predetermined command over the given path, and compute the response time as the difference between the receive timestamp and the transmit timestamp. Numerous other techniques can be used to monitor response times for the predetermined command for detection of response time degradation over respective ones of the paths between the host device and the storage array.

In some embodiments, all detected response time degradations can be compared to a specified threshold, with only those response time degradations that exceed the threshold contributing to a possible affirmative determination in step 204. Accordingly, the determination in step 204 can utilize one or more thresholds so as to limit affirmative determinations to cases of substantial response time degradations.

For example, the detection of a performance issue with a given path in this embodiment illustratively comprises determining a current response time for the given path from the response by the storage array to a current instance of the predetermined command for detection of response time degradation, comparing the current response time to a previous response time for the given path as determined from a response by the storage array to a previous instance of the predetermined command, and responsive to the current response time being greater than the previous response time by more than a threshold amount, detecting the performance issue with the given path. The difference between the current response time and the previous response time provides the above-noted response time differential in this example. Other performance issue detection techniques utilized in other embodiments can be based on the response time of a single period rather than on a differential response time between periods.

In step 206, the MPIO driver automatically places the set of paths having lower performance in a standby mode of operation and places the other set in an active mode of operation.

In step 208, the MPIO driver automatically places one of the sets of paths in the standby mode of operation and places the other set in the active mode of operation.

Accordingly, the detection of an above-threshold performance deviation between the first and second sets of paths in step 204 results in the lower-performing set of paths being automatically placed in the standby mode of operation, while the absence of an above-threshold performance deviation between the first and second sets of paths in step 204 results in a selected one of the first and second sets of paths being automatically placed in the standby mode of operation. In either case, the set of paths not automatically placed in the standby mode of operation is automatically placed in the active mode of operation.

The selection of one of the sets of paths to be placed in the standby mode of operation absent any above-threshold performance deviation between the sets of paths can be based on a preselection by an administrator or other user. The preselection identifies a particular storage array which should be treated as "local" relative to the host device with the other storage array being treated as "remote." Alternatively, this selection of one of the sets of paths can be an arbitrary selection made by the MPIO driver.

The MPIO driver is illustratively configured to avoid sending IO operations over the set of paths that is in the standby mode of operation. For example, the MPIO driver can send no IO operations or a minimal number of IO operations over the set of paths that is in the standby mode of operation.

In step 210, a determination is made as to whether or not there are any additional paths to be assigned to the first or second sets. If there is at least one additional path to be assigned to the first or second sets, the process returns to step 200 to assign the path or paths to the first or second sets based on their respective corresponding storage arrays. Otherwise, the process returns to step 202 to continue to monitor the relative performance of the first and second sets of paths. For example, the MPIO driver can interchange the standby and active modes of operation of the respective sets of paths responsive to detection of a performance degradation for the set of paths that is in the active mode of operation.

Multiple additional instances of the FIG. 2 process are assumed to be performed in respective ones of one or more additional host devices that share multiple storage arrays arranged in an active-active configuration.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and automated standby setting functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated standby setting arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
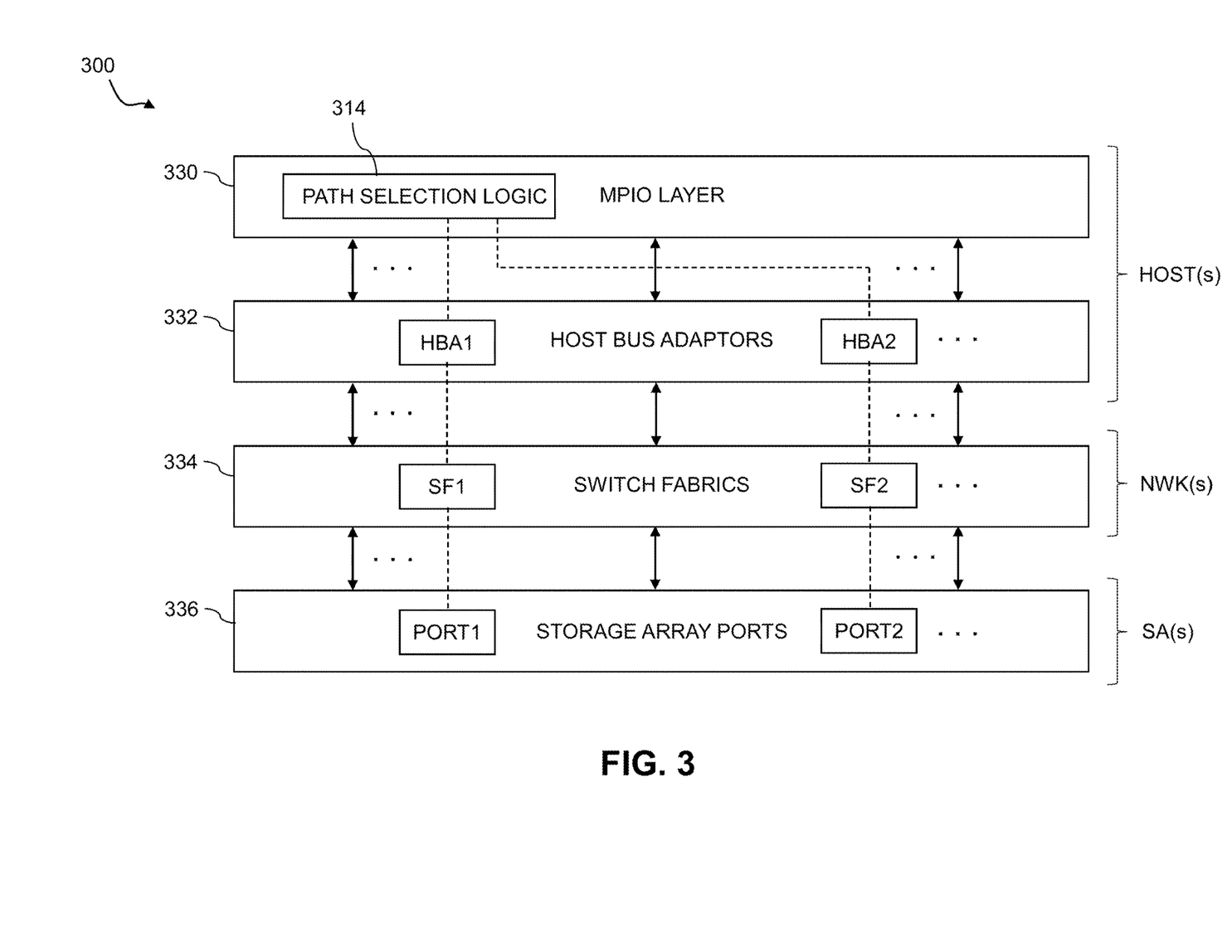
FIG. 3 is a block diagram showing multiple layers of a layered system architecture that includes a multi-path layer with automatic standby setting functionality in an illustrative embodiment.

Referring now to FIG. 3, another illustrative embodiment is shown. In this embodiment, an information processing system 300 comprising at least one instance of path selection logic 314 is configured in accordance with a layered system architecture that includes an MPIO layer 330, an HBA layer 332, a switch fabric layer 334 and a storage array port layer 336. The MPIO layer 330 and the HBA layer 332 are associated with one or more host devices, the switch fabric layer 334 is associated with one or more SANs or other types of networks, and the storage array port layer 336 is associated with one or more storage arrays ("SAs"). The MPIO layer 330 is an example of what is also referred to herein as a multi-path layer, and comprises one or more MPIO drivers implemented in respective host devices. Each such MPIO driver illustratively comprises an instance of path selection logic 314 configured substantially as previously described. Additional or alternative layers and path selection logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2. These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, as in the FIG. 1 embodiment, or alternatively different ones of the host devices can have different numbers and types of paths to the storage array.

The path selection logic 314 of the MPIO layer 330 in this embodiment selects paths for delivery of IO operations to the one or more storage arrays having the storage array ports of the storage array port layer 336. The path selection is illustratively based at least in part on path information such as HBAs and storage array ports, and in some embodiments further takes into account additional path information such as fabric identifiers. For example, a given retry of a failed IO operation under such a path selection algorithm can select a path having a different fabric, host device HBA and storage array port for a given retry than that of the path selected for the original failed IO operation.

The path selection logic 314 is illustratively configured to determine storage array identifiers for respective paths, and to assign the paths to sets of paths for the different storage arrays, using predetermined commands as previously described.

The path selection logic 314 also illustratively has information indicating any particular path that may be exhibiting a response time degradation. Such information is determined utilizing other predetermined commands for detection of response time degradation, although it is possible in some embodiments that the same predetermined commands can be used both for determination of storage array identifiers and detection of response time degradation.

The path selection logic 314 utilizes the response time degradation information to automatically place a given set of paths associated with a particular storage array into a standby mode of operation in the manner previously described. It alters its selection of paths for delivery of IO operations based at least in part on which set of paths is in the standby mode of operation and which set of paths is in the active mode of operation. This advantageously avoids exposing the host device to current or future problems associated with RSCN storms or other types of fabric-related performance degradations.

As mentioned previously, different instances of the above-described path selection process can be performed by different MPIO drivers in different host devices.

Another example of an automated standby setting process implementing utilizing an MPIO layer such as MPIO layer 330 of the FIG. 3 embodiment will now be described in more detail. Such a process utilizes path selection logic of one or more host devices to control path selection for delivery of IO operations to storage arrays arranged in an active-active configuration. The process in the present example includes the following steps.

1. An MPIO driver of the host device utilizes a predetermined command based on the SCSI 0x8B device inquiry ("Inq") page to determine which paths are connected to which storage array. The 0x8B device Inq page reports to the initiator the storage array native serial number and device number. Accordingly, even in situations in which a LUN is spoofing another device, the MPIO driver will get the actual storage array serial number and device number, rather than the spoofed information.

2. Using the above-described information, the MPIO driver will map each path comprising an initiator-target *nexus* to its corresponding one of the storage arrays.

3. The MPIO driver will measure, on each available path, the response time from each storage array.

4. If the set of paths to one storage array is considerably slower than the set of paths to the other storage array, then the MPIO driver will place the slower set of paths into a standby mode of operation. This is illustratively achieved by designating the slower set of paths as respective automatic standby ("Auto-STBY") paths.

5. If the MPIO driver does not find a sufficient performance gradient between the response times for the different sets of paths, the MPIO driver selects one of the storage arrays and places it in the standby mode of operation while the other storage array is placed in the active mode of operation. This selection can be based on a preselection by an administrator or other user of a particular storage array which should be treated as "local" relative to the host device with the other storage array being treated as "remote." Alternatively, it can be an arbitrary selection made by the MPIO driver. The latter type of selection is appropriate, for example, in installations in which the storage arrays are located in relatively close proximity, such as in adjacent buildings in the same city.

6. The MPIO driver avoids sending IO operations on the paths that are designated as respective Auto-STBY paths.

7. If significant path performance issues arise for the set of paths currently in the active mode of operation, the MPIO driver interchanges the standby and active modes of operation of the respective sets of paths.

Accordingly, the MPIO driver in the foregoing example separates the paths into first and second sets of paths to respective first and second storage arrays. It places one of the sets of paths in a standby mode of operation, and the other in an active mode of operation. As a result, the host device is not exposed to issues on both the SAN that goes to one array and the SAN that goes to the other array.

A similar process is assumed to be performed by any other MPIO drivers on any respective other host devices.

Some embodiments include only a single host devices, although multiple host devices are used in illustrative embodiments. For example, a single host device can be connected to two storage arrays that are arranged in an active-active configuration. The MPIO driver on that host device can select one of the sets of paths to one of the storage arrays to be in an active mode and the other set of paths to the other storage array to be in a standby mode. The MPIO driver automatically switches from one set of paths to the other if its corresponding SAN experiences significant performance issues.

Also, it should be noted that the host devices in a given embodiment need not be in an active-active configuration. For example, multiple host devices can be arranged in a cluster and the host devices can be arranged in active-passive configurations, active-active configurations, or combinations thereof.

The particular automated standby setting arrangements described above are presented by way of illustrative example only. Numerous alternative arrangements of these and other features can be used in implementing automated standby setting in other embodiments.

The illustrative embodiments disclosed herein can provide a number of significant advantages relative to conventional arrangements. For example, some embodiments configure a multi-path layer of one or more host devices to include automatic standby setting functionality for sets of paths utilized to communicate with multiple storage systems arranged in an active-active configuration.

The multi-path layer in such arrangements can be configured, for example, to separate a plurality of paths into sets of paths associated with respective storage arrays, and to automatically designate one set of paths as standby paths and the other set of paths as active paths, even in the absence of any substantial performance deviation between the sets of paths.

Such embodiments advantageously allow the MPIO driver to limit the exposure of the host device to current or future issues associated with a particular fabric, such as a current or future performance degradation due to an ongoing fabric rediscovery process or other fabric-related issue of the particular fabric.

As a result, improved performance in processing of IO operations is achieved in illustrative embodiments.

Moreover, data replication across multiple storage arrays arranged in an active-active configuration is facilitated, thereby providing more efficient protection against failures.

Illustrative embodiments are configured to enhance IO resiliency to fabric-related intermittent interruptions.

For example, illustrative embodiments can substantially reduce the exposure of the host device to performance degradations associated with RSCN storms that result from fabric rediscovery in conjunction with network switch fabric reconfigurations. If the set of paths to one of the storage arrays via one of the switch fabrics is automatically set to the standby mode of operation, the host device will not be vulnerable to RSCN storms or other fabric-related performance degradations in that switch fabric.

In addition, illustrative embodiments can be configured such that the host device sends its IO operations to only one of the storage arrays of the active-active configuration, by avoiding the set of paths that was automatically set to the standby mode of operation. This improves the ability of that storage array to pre-fetch data from disk or other backend storage devices, as the storage array set to the active mode of operation sees all of the IO operations from the host device and can therefore better predict the next data needed by the host device.

The disclosed functionality can be implemented using a wide variety of different storage arrays and other types of storage systems.

These and other arrangements are advantageously configured to provide efficient path selection even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different MPIO driver configurations and associated automated standby setting arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a first host device configured to communicate with first and second storage systems over at least one network;
the first host device comprising:
a multi-path input-output driver configured to control delivery of input-output operations from the first host device to the first and second storage systems;
wherein the multi-path input-output driver is further configured:
to separate paths from the first host device to the first and second storage systems into a first set of paths from the first host device to the first storage system and a second set of paths from the first host device to the second storage system;
to monitor performance of at least subsets of the first and second sets of paths;
responsive to detection of a performance deviation between the first and second sets of paths that exceeds a specified threshold, to automatically place the paths of the set exhibiting lower performance in a standby mode of operation and the paths of the other set in an active mode of operation; and
to otherwise automatically place the paths of one of the sets in the standby mode of operation and the paths of the other one of the sets in the active mode of operation;
wherein the first and second storage systems are arranged in an active-active configuration relative to one another; and
wherein the multi-path input-output driver in separating the paths into the first and second sets of paths is further configured:
to send a predetermined command over each of the paths;
to determine storage system identifiers for the respective paths based at least in part on responses to the predetermined command; and
to assign each of the paths to one of the first and second sets of paths based at least in part on its corresponding storage system identifier.

2. The apparatus of claim 1 wherein the predetermined command comprises a Small Computer System Interface (SCSI) command of a particular type.

3. The apparatus of claim 1 wherein the predetermined command comprises an inquiry command that when sent to one of the first and second storage systems returns a storage system identifier comprising at least one of a serial number and a device number of a storage array of that storage system.

4. The apparatus of claim 1 wherein the predetermined command comprises a vendor unique command of the first and second storage systems.

5. The apparatus of claim 1 wherein the one or more networks over which the first host device is configured to communicate with the first and second storage systems comprise multiple distinct switch fabrics including at least:
a first switch fabric over which the first host device is configured to communicate with the first storage system; and
a second switch fabric over which the first host device is configured to communicate with the second storage system.

6. The apparatus of claim 1 wherein the paths are associated with respective initiator-target pairs with the initiators being implemented on the first host device and the targets being implemented on the first and second storage systems.

7. The apparatus of claim 6 wherein the initiators of the initiator-target pairs comprise respective host bus adaptors of the first host device and the targets of the initiator-target pairs comprise respective storage array ports of the first and second storage systems.

8. The apparatus of claim 1 wherein the multi-path input-output driver in monitoring performance of at least subsets of the first and second sets of paths is further configured:
to measure response times of respective ones of the paths of the first and second sets of paths; and
to compute the performance deviation between the first and second sets of paths based at least in part on the measured response times.

9. The apparatus of claim 8 wherein the multi-path input-output driver in measuring response times of respective ones of the paths of the first and second sets of paths is further configured to measure the response times utilizing a predetermined command sent over each of the paths.

10. The apparatus of claim 1 wherein the multi-path input-output driver is further configured to avoid sending input-output operations over the set of paths that is in the standby mode of operation.

11. The apparatus of claim 10 wherein the multi-path input-output driver is further configured to send no input-output operations over the set of paths that is in the standby mode of operation.

12. The apparatus of claim 1 wherein the multi-path input-output driver is further configured to interchange the standby and active modes of operation of the respective sets of paths responsive to detection of a performance degradation for the set of paths that is in the active mode of operation.

13. A method comprising:
configuring a first host device to communicate with first and second storage systems over at least one network; and
controlling delivery of input-output operations from the first host device to the first and second storage systems via a multi-path input-output driver of the first host device;
the multi-path input-output driver:
separating paths from the first host device to the first and second storage systems into a first set of paths from the first host device to the first storage system and a second set of paths from the first host device to the second storage system;
monitoring performance of at least subsets of the first and second sets of paths; and
responsive to detection of a performance deviation between the first and second sets of paths that exceeds a specified threshold, automatically placing the paths of the set exhibiting lower performance in a standby mode of operation and the paths of the other set in an active mode of operation; and
otherwise automatically placing the paths of one of the sets in the standby mode of operation and the paths of the other one of the sets in the active mode of operation;
wherein the first and second storage systems are arranged in an active-active configuration relative to one another; and
wherein the multi-path input-output driver separates the paths into the first and second sets of paths by:
sending a predetermined command over each of the paths;
determining storage system identifiers for the respective paths based at least in part on responses to the predetermined command; and
assigning each of the paths to one of the first and second sets of paths based at least in part on its corresponding storage system identifier.

14. A computer program product comprising a non-transitory processor-readable storage medium having stored therein program code of one or more software programs, wherein the program code, when executed by a first host device comprising a multi-path input-output driver, the first host device being configured to communicate over at least one network with first and second storage systems, causes the multi-path input-output driver:
to control delivery of input-output operations from the first host device to the first and second storage systems;
to separate paths from the first host device to the first and second storage systems into a first set of paths from the first host device to the first storage system and a second set of paths from the first host device to the second storage system;
to monitor performance of at least subsets of the first and second sets of paths; and
responsive to detection of a performance deviation between the first and second sets of paths that exceeds a specified threshold, to automatically place the paths of the set exhibiting lower performance in a standby mode of operation and the paths of the other set in an active mode of operation; and
to otherwise automatically place the paths of one of the sets in the standby mode of operation and the paths of the other one of the sets in the active mode of operation;
wherein the first and second storage systems are arranged in an active-active configuration relative to one another; and
wherein the multi-path input-output driver separates the paths into the first and second sets of paths by:
sending a predetermined command over each of the paths;
determining storage system identifiers for the respective paths based at least in part on responses to the predetermined command; and
assigning each of the paths to one of the first and second sets of paths based at least in part on its corresponding storage system identifier.

15. The computer program product of claim 14 wherein the one or more networks over which the first host device is configured to communicate with the first and second storage systems comprise multiple distinct switch fabrics including at least:
a first switch fabric over which the first host device is configured to communicate with the first storage system; and
a second switch fabric over which the first host device is configured to communicate with the second storage system.

16. The computer program product of claim 14 wherein the multi-path input-output driver is further configured to interchange the standby and active modes of operation of the respective sets of paths responsive to detection of a performance degradation for the set of paths that is in the active mode of operation.

17. The method of claim 13 wherein the one or more networks over which the first host device is configured to communicate with the first and second storage systems comprise multiple distinct switch fabrics including at least:
a first switch fabric over which the first host device is configured to communicate with the first storage system; and
a second switch fabric over which the first host device is configured to communicate with the second storage system.

18. The computer program product of claim 14 wherein the multi-path input-output driver in monitoring performance of at least subsets of the first and second sets of paths is further configured:
to measure response times of respective ones of the paths of the first and second sets of paths; and
to compute the performance deviation between the first and second sets of paths based at least in part on the measured response times.

19. The computer program product of claim 18 wherein the multi-path input-output driver in measuring response times of respective ones of the paths of the first and second sets of paths is further configured to measure the response times utilizing a predetermined command sent over each of the paths.

20. The computer program product of claim 14 wherein the multi-path input-output driver is further configured to avoid sending input-output operations over the set of paths that is in the standby mode of operation.

* * * * *